Patented May 20, 1924.

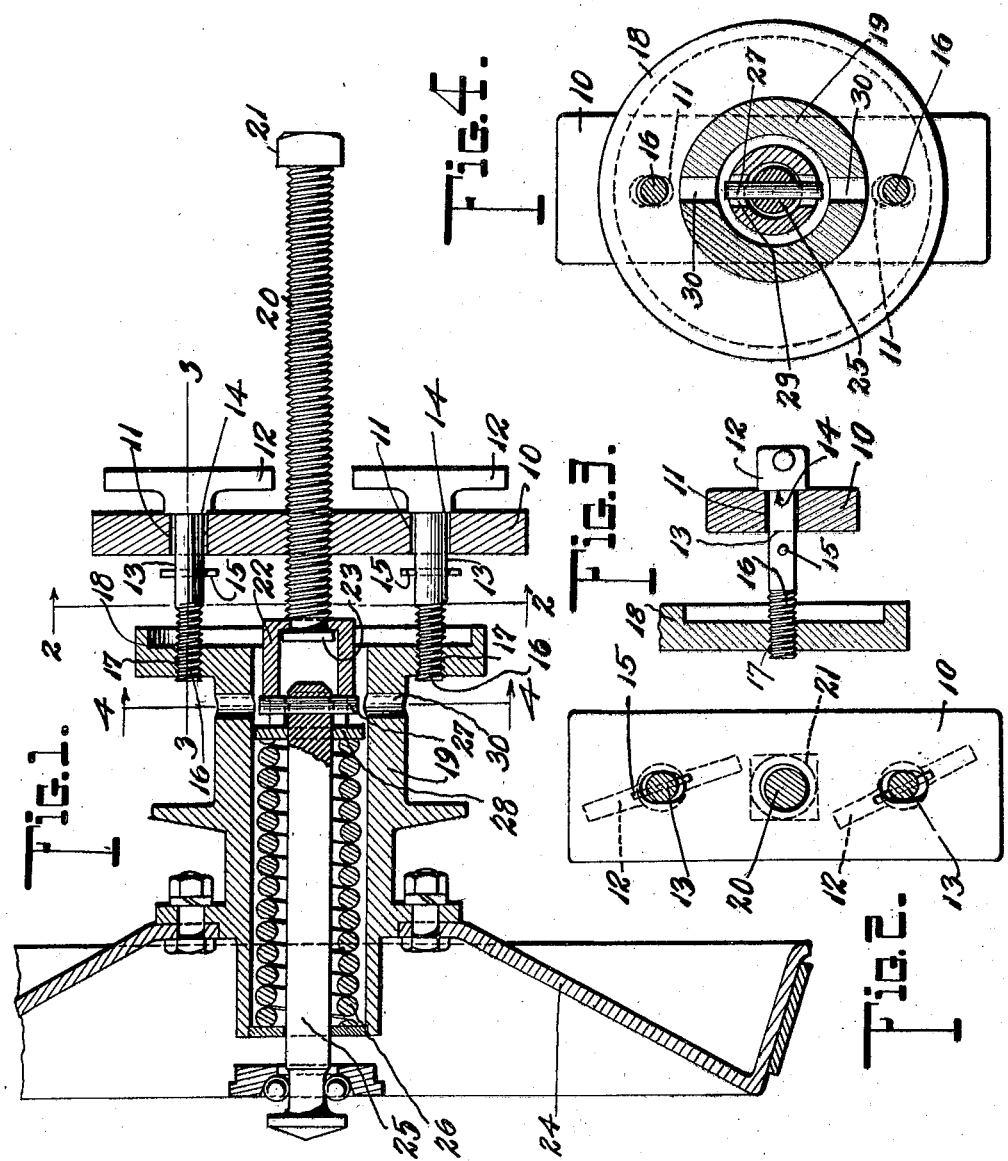

1,494,832

UNITED STATES PATENT OFFICE.

WILLIAM A. GRANT, OF DORA, ALABAMA.

CLUTCH-REMOVING DEVICE.

Application filed October 1, 1923. Serial No. 665,858.

*To all whom it may concern:*

Be it known that I, WILLIAM ANGUS GRANT, a citizen of the United States, residing at Dora, in the county of Walker and State of Alabama, have invented certain new and useful Improvements in Clutch-Removing Devices, of which the following is a specification.

This invention relates to a clutch removing device, and particularly to a construction for compressing the clutch spring so that it may be released and the clutch member tensioned thereby removed.

In prior constructions of this character where the compressing screw was rigidly mounted upon the clutch member accurate individual adjustment of the separate attaching means was necessary in order that the screw member should travel in a true axial line relative to the spring to avoid tilting or side movement thereof and such adjustment required time and skill in order to dispose the screw supporting plate parallel with the face of the clutch flange. In other types of such spring compressors the hook connection with the clutch did not afford a sufficiently firm or fixed attachment to effect the proper pressure upon the spring in a straight line and were liable to accidentally change position during the releasing action.

This invention has for an object to provide a novel and improved construction in which the plate carrying the compressing screw is attached to the clutch but has a restricted movement upon its attaching means to permit the plate to assume a position parallel with the end of the clutch in order to dispose the screw in a line axially of the spring.

A further object of the invention is to provide an improved construction of attaching bolt having a portion of less diameter than the aperture in the plate by which it is carried and also capable of limited longitudinal movement thereon so that upon the application of pressure the plate may adjust itself into seating engagement with an abutment on the bolt.

Other and further objects and advantages of the invention will be hereinafter set forth and the novel features thereof defined by the appended claims.

In the drawing:—

Figure 1 is an elevation of the invention with the clutch and tool head in section;

Figure 2 is a section on line 2—2 of Figure 1;

Figure 3 is a similar view on line 3—3 of Figure 1; and

Figure 4 is a section on line 4—4 of Figure 1.

Like numerals refer to like parts throughout the several views.

The invention is particularly adapted for application to a clutch of the type used in the Chevrolet automobile and is shown as so applied, but is not confined in its use to such particular form of clutch.

In this disclosure of the invention the numeral 10 designates a plate or bar of any desired size or configuration provided at opposite sides of its longitudinal center with apertures 11 therethrough. Extending through these apertures are the attaching bolts 12 which are provided with a portion 13 of less diameter than the aperture of the plate and with an abutting shoulder 14 against which the plate seats when the attaching bolt is connected to the clutch. This bolt is also provided with a pin 15 by which it is retained against removal from the plate and a threaded end portion 16 adapted to engage cooperating apertures 17 in the flange 18 of the clutch member 19, these latter parts being of the usual construction.

The attaching bolt just described may be duplicated to any desired extent, and two thereof are herein shown as connecting with the flange apertures. The plate 10 has threaded therethrough a centrally disposed pressure screw 20 provided at one end with an operating head 21 of any preferred type and at its opposite end with a tool head 22 loosely swiveled thereon as shown at 23 so as to be capable of both a rotary and slight rocking movement in order to seat itself upon the end of the clutch spring.

In the form of clutch shown the clutch disk 24 is mounted upon a relatively fixed pin 25 and held in driving contact by a tension spring 26 which bears at its outer end against a washer plate 28 and is retained under tension by a cross pin 27. The tool head when applied to the spring as shown in Figure 1 is provided with a slot or recessed portion 29 which embraces the pin so that the end of the head may bear against the plate 28 compressing the spring so that the pin 27 may be brought into alignment with an aperture 30 in the clutch collar 19 and removed from the supporting post 25. For this purpose the post is capable of a limited longitudinal movement and the base of the slot 29 by engagement with the pin will move it into position for such disconnection.

In re-assembling the parts an opposite operation occurs as the spring is primarily placed under tension in order to permit the insertion of the pin through the supporting post.

The operation of the invention will be apparent from the foregoing description and it will be seen that it is only necessary to thread the attaching bolts into the usual flange of the clutch to an equal extent and to dispose the tool head over the retaining pin. When pressure is applied by the screw member the supporting plate is carried into engagement with the abutments 14 upon the attaching bolts and its loose connection therewith permits said plate to adjust itself for the equalization of any minor inaccuracies and permits the tool head to travel in a direct line axially of the spring so that all danger of twisting or side movement thereof is avoided. This construction permits the attaching bolts to be successively applied and adjusted and effects the operation of the compressing screw by a single means while its supporting plate is rigidly held against accidental displacement.

The invention also presents a very simple and efficient construction adapted to be economically manufactured and for quick application to a clutch member without the necessity of skilled labor for that purpose.

While the specific details of construction have been shown and described, still the invention is not confined thereto as changes and alterations may be made therein without departing from the spirit of the invention as recited in the following claims.

Having thus described my invention, what I claim as new and desire to secure by Letters Patent is:

1. In a clutch removing device, a supporting plate formed with apertures, a spring engaging pressure screw mounted therein, and attaching means having adjustable engagement with a clutch member and loosely mounted in the apertures of said plate for lateral and longitudinal movement independent thereof.

2. In a clutch removing device, a supporting plate formed with apertures, a pressure screw mounted therein and provided with a swiveled head, and attaching bolts for said plate having a diameter less than the apertures in the plate through which they pass and threaded to engage a portion of said clutch.

3. In a clutch removing device, a supporting plate formed with apertures, a pressure screw mounted therein and provided with a swiveled head, attaching bolts for said plate having a diameter less than the apertures in the plate through which they pass and threaded to engage a portion of said clutch, and a fixed abutment upon said bolts against which said plate bears when under pressure.

4. In a clutch removing device, a supporting plate formed with apertures, a pressure screw mounted therein and provided with a swiveled head, attaching bolts for said plate having a diameter less than the apertures in the plate through which they pass, an abutment upon said bolts against which said plate bears when under pressure, and a retaining pin extended through said bolt to prevent disconnection from said plate.

In testimony whereof I affix my signature.

WILLIAM A. GRANT.